United States Patent [19]

Finzel

[11] Patent Number: 4,995,728
[45] Date of Patent: Feb. 26, 1991

[54] CONFIGURATION WITH SEVERAL SPLICING MODULES

[75] Inventor: Lothar Finzel, Munich, Fed. Rep. of Germany

[73] Assignee: Siemens Aktiengesellschaft, Berlin & Munich, Fed. Rep. of Germany

[21] Appl. No.: 446,926

[22] Filed: Dec. 6, 1989

[30] Foreign Application Priority Data

Dec. 16, 1988 [DE] Fed. Rep. of Germany ....... 3842904

[51] Int. Cl.[5] .................................. G02B 6/38
[52] U.S. Cl. .............................. 350/96.21; 350/96.22
[58] Field of Search ............... 350/96.22, 96.20, 96.21, 350/96.24

[56] References Cited

U.S. PATENT DOCUMENTS

| 4,500,166 | 2/1985 | Kunze .............................. 350/96.20 |
| 4,754,876 | 7/1988 | Noon et al. .................. 350/96.21 X |
| 4,776,662 | 10/1988 | Valleix .............................. 350/96.20 |
| 4,793,678 | 12/1988 | Matsumoto et al. .......... 350/96.2 X |
| 4,832,436 | 5/1989 | Goto et al. ........................ 350/96.2 |

FOREIGN PATENT DOCUMENTS

| 1108904 | 6/1980 | Canada .............................. 350/96.2 |
| 2950833 | 9/1982 | Fed. Rep. of Germany . |
| 3133586 | 3/1983 | Fed. Rep. of Germany . |
| 3442429 | 5/1986 | Fed. Rep. of Germany . |
| 3536241 | 4/1987 | Fed. Rep. of Germany . |

Primary Examiner—John D. Lee
Assistant Examiner—Stephen W. Barns
Attorney, Agent, or Firm—Kenyon & Kenyon

[57] ABSTRACT

A compact configuration of a large number of splicing modules that enables each splicing module to be freely accessible is made by connecting each splicing module to a carrier with a pivotal connection so that the pivoting axis extends through the interior of the splicing module, parallel to the direction in which the light waveguide bundle is introduced into the splicing module. The pivoting axes of several splicing modules extend parallel to one another. Each splicing module has a hollow cylinder that is mounted to the carrier with U-sections. Light waveguides are led through the hollow cylinders to each splicing module. No excess length of the light waveguides is necessary since the hollow cylinders remain stationary during pivoting of a splicing module. The pivotal connection of the splicing modules enables them to be "leafed through" like a book. Each splicing module can be accessed in this manner so that the light waveguide splices located on it can be renewed or repaired. The invention can be used in light waveguide splice coupling boxes.

20 Claims, 1 Drawing Sheet

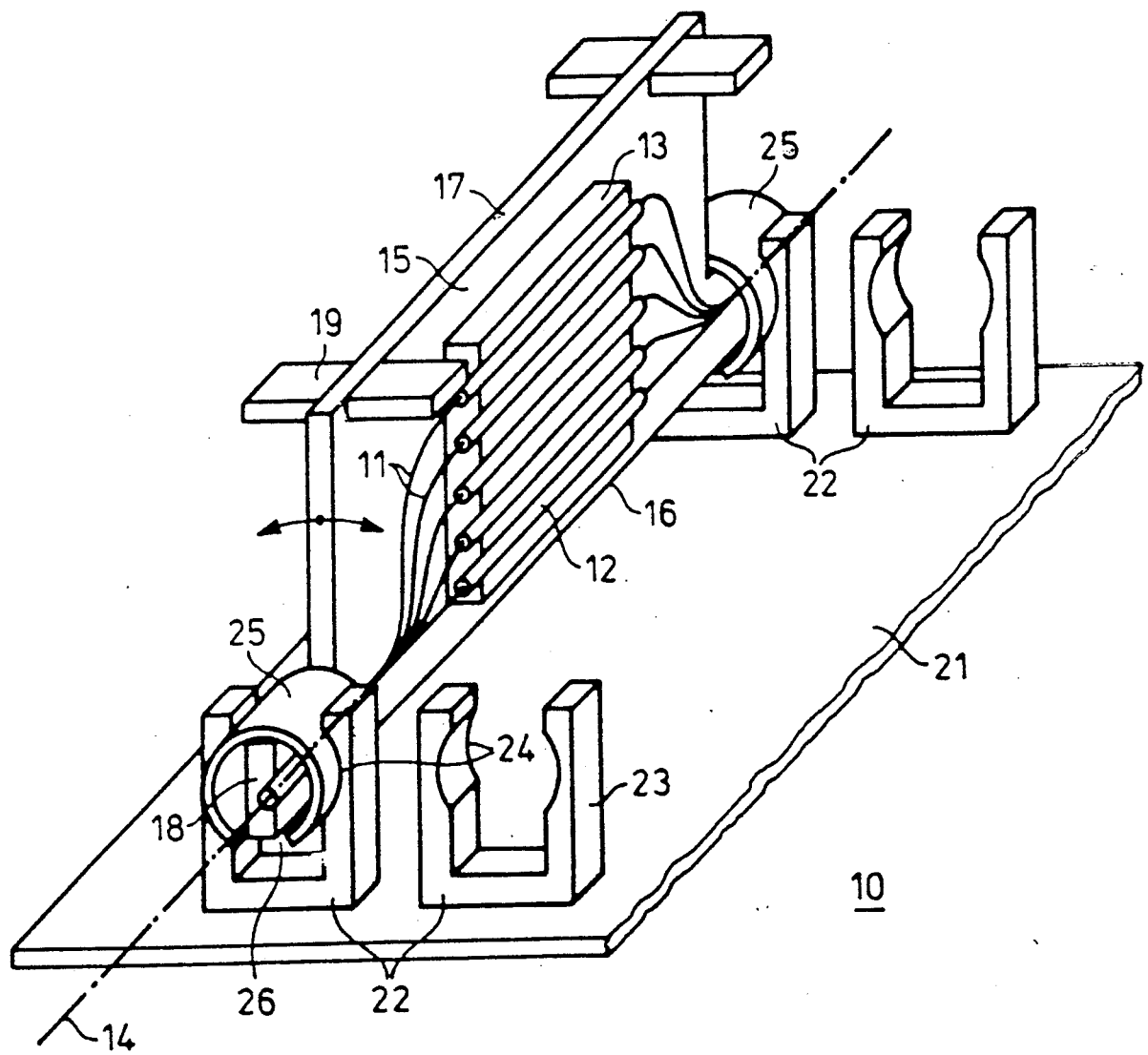

CONFIGURATION WITH SEVERAL SPLICING MODULES

BACKGROUND OF THE INVENTION

The present invention relates to a configuration for splicing optical waveguides in which several splicing modules are mounted to pivot and be individually accessible with each splicing module supporting at least one waveguide.

To splice together several light waveguide cables that each contain several optical fibers, it is necessary to accommodate the individual splices in the most compact way possible Moreover, it is important that each individual splice be readily accessible since it is sometimes necessary to repair or to renew the splices.

U.S. Pat. No. 4,500,166 discloses an arrangement of light waveguide splices in which each splice is combined in a splicing module. The individual splicing modules can be individually pivoted out when necessary to give access to each individual light waveguide splice. However, the arrangement described in this reference has the disadvantage that the light waveguide that leads to the splicing modules must be rather long to allow it to pivot out of a splicing module. Furthermore, a great deal of space is required to allow one individual splicing module to pivot out.

SUMMARY OF THE INVENTION

The present invention creates a compact configuration of splicing modules for light waveguide splices that nevertheless allows ready access to each individual light waveguide splice.

The present invention attains this objective by positioning the splicing modules on a carrier so that each splicing module has an individual pivotal connection with the carrier so that the pivoting axis extends through the interior of the splicing module parallel to the direction of introduction of the light waveguide bundle(s) into the splicing module. The pivoting axes of several splicing modules extend parallel to each other.

The individual splicing modules can be "leafed through" like the pages of a book because each individual splicing module has its own pivotal connection with the carrier. In this way each individual splicing module can be accessed from both sides. None of the splicing modules need be removed to repair any one of the splices. Exposing the splice needing repair requires laterally pivoting only the splicing module supporting the splice. The adjacent module on the side facing the splice in need of repair is simultaneously pivoted away toward the other side so that the splice needing repair is freely accessible. The light waveguides that are introduced upon pivoting the splicing module are not stressed or bent as happens with the arrangement known from prior art. The pivoting axis within each splicing module extends parallel to the direction in which the light waveguide bundle(s) are introduced into the splicing module. The necessary excess length in the light waveguides is thereby minimized.

The present invention can be so implemented that the site(s) at which the light waveguides extend into a splicing module lie on the pivoting axis of the splicing module. This construction ensures that the entering and outgoing light waveguide bundles are not bent when pivoted out of a module but rather merely twisted. The waveguide bundles are therefore subjected to extremely low mechanical loading. The site at which a light waveguide bundle enters a splicing module remains stationary during pivoting. No excess length of the light waveguide bundle is necessary at this site to allow the splicing module to be pivoted.

The present invention is so implemented that each splicing module contains a mounting plate that has at least one cylindrical axial body on one of its longitudinal sides which is developed as a hollow cylinder and supported in a U-section fixedly connected with the carrier. This structure of a splicing module permits a splicing module to be easily assembled and also easily equipped with light waveguide splices. The individual parts of a splicing module can be manufactured in a simple manner. The mounting plate and the hollow cylinder and the U-section, for example, can be manufactured from a synthetic material in an injection molding process at especially low cost. The bearing of the hollow cylinders in the U-sections enables the splicing module to readily rotate. Light waveguide splices are, for example, deposited on the mounting plate of the splicing module parallel to each other, next to each other in combs or simply affixed by adhesion on the mounting plate. Both sides of the mounting plate can be covered with light waveguide splices. A known light waveguide connector can serve as light waveguide connector for the splices.

The present invention can be implemented so that the light waveguides leading to a splicing module extend through one of the hollow cylinders into the interior of the splicing module in each instance. This construction enables the site at which a light waveguide bundle leads into the module to be in the vicinity of the pivoting axis. This construction also places very little stress on the light waveguide when the splicing module pivots.

Furthermore, the present invention can be advantageously implemented with each hollow cylinder having a continuous longitudinal slit. The light waveguides coming off a splicing module can be pulled out through this longitudinal slit if it is necessary to take the entire splicing module out of the configuration. Pairs of light waveguides that are spliced together with the light waveguide connector also can be slid through these longitudinal slits into the splicing module.

A further embodiment of the invention provides that the U-sections are made of an elastic synthetic material. The elasticity of the synthetic material allows the hollow cylinders to be pressed into the U-sections in a particularly simple manner. This construction eliminates any danger of breaking a U-section or a hollow cylinder. Providing the hollow cylinders with longitudinal slit also contributes to the greater elasticity in the bearing mechanism.

A further embodiment of the invention provides that the U-sections have segments with circularly shaped recesses. These circularly shaped recesses in the segments are developed so that they face each other on the two shanks of a U-section to receive one of the hollow cylinders as a form fit. All splicing modules lie adjacent each other where they can be fastened at a reproducible height above the carrier to create a well ordered configuration of the splicing modules. The recesses, for example, prevent a splicing module from having its hollow cylinder pressed out of U-section when pivoted.

The present invention also can be so implemented that the splicing modules have spacers. The spacers prevent the mounting plates or the light waveguide connectors fastened on the mounting plates of any two adjacent splicing modules from coming in contact with each other and damaging the light waveguide splices. The spacers can be attached on a longitudinal side of the mounting plate facing away from the pivoting axis of the module.

The present invention can also advantageously be so implemented that each of several splicing modules are provided with a common fastener. The fastener can comprise, for example, two elastic wire straps that are detachably fastened beside the two outermost splicing modules of a row of splicing modules on the carrier. The elastic wire straps press together all splicing modules between them.

The present invention can also be so implemented that the individual U-sections can plug into one another. The carrier then comprises several U-sections plugged into one another. This construction has the advantage that the size of the individual carrier can be adapted on site to the number of the splices to be deposited or the number of the splicing modules required.

BRIEF DESCRIPTION OF THE DRAWING

The drawing shows a perspective view of a splicing module of the present invention.

DETAILED DESCRIPTION

A splicing module 10 comprises a mounting plate 15 which has stud-shaped extensions 18 at one of its longitudinal sides 16. Several light waveguide connectors 12 are fastened on the mounting plate 15 one next to another on both sides in deposition combs 13. Hollow cylinders 25 are slid on the stud-shaped extensions 18 on the longitudinal side 16 of the mounting plate 15. The hollow cylinders are fastened to the stud-shaped extensions 18 by adhesion. The hollow cylinders 25 have longitudinal slits 26 on their under side. A bundle 30 including several light waveguides 11 that are to be connected with each other in a light waveguide connector 12 is brought through the hollow cylinders 25 to the splicing module on both sides. The hollow cylinders 25 are clamped into U-sections 22 which are then fastened in pairs on a carrier 21. The U-sections 22 have circular-segment-shaped recesses 24 on the inside of their shanks 23 which form-fittingly receive the hollow cylinders 25. In this manner the hollow cylinders 25 are pivoted in the U-sections 22. The splicing module 10 is thereby pivotable about the pivoting axis 14. The carrier 21 and the splicing modules 10 are placed in a coupling box not shown in the Figure. Several pairs of U-sections are arranged on the carrier 21 next to each other in two rows so that a row of splicing modules 10 can be pivotally arranged next to each other on the carrier. Spacers 19 are fastened on the longitudinal side 17 of the mounting plates 15 of each splicing module to establish the minimum distance between two adjacent splicing modules 10. This prevents the light waveguide connectors 12 of two adjacent splicing modules 10 from coming into contact with each other and thereby being damaged.

What is claimed is:

1. A configuration of light waveguide splicing modules comprising:
   (a) a plurality of individually accessible splicing modules;
   (b) a plurality of light waveguide connectors deposited on each of said modules;
   (c) at least one light waveguide bundle containing a plurality of light waveguides leading to each splicing module, with the light waveguides of said bundles held in said connectors;
   (d) a carrier; and
   (e) a pivotable connection pivotally supporting each splicing module individually on said carrier along a pivoting axis which extends through the interior of the splicing module and is parallel to the direction of introduction of the light waveguide bundle into the splicing module, the site on which said light waveguide bundle enters into each of said splicing modules lying on the pivoting axis of said splicing module, the pivoting axes of said plurality of splicing modules extending parallel to each other.

2. A configuration according to claim 1 wherein each splicing module includes a mounting plate having a longitudinal side and said pivotable connection comprises at least one cylindrical axial body implemented as a hollow cylinder at said longitudinal side and a U-section fixedly connected to the carrier in which said hollow cylinder is supported for rotation.

3. A configuration as defined in claim 2, wherein each of said light waveguide bundles enters said splicing module through the hollow cylinder.

4. A configuration as defined in claim 3, wherein each hollow cylinder has a continuous longitudinal slit.

5. A configuration as defined in claim 4, wherein each U-section is made of an elastic synthetic material.

6. A configuration as defined in claim 4, wherein each U-section has circular segment shaped recesses.

7. A configuration as defined in claim 4, wherein each of said U-sections includes means for interconnecting with another U-section, said carrier is divided into sections, each carrier section supporting one of said splicing modules supported in said U-section, whereby the configuration is formed by assembling a plurality of carrier sections by interconnecting the U-sections of the carrier sections.

8. A configuration as defined in claim 3, wherein each U-section is made of elastic synthetic material.

9. A configuration as defined in claim 3, wherein each U-section has circular segment shaped recesses.

10. A configuration as defined in claim 3, wherein each splicing module further includes a spacer spacing it from adjacent modules.

11. A configuration as defined in claim 3, and further comprising a common fastening means for a plurality of the splicing modules.

12. A configuration as defined in claim 3, wherein each of said U-sections includes means for interconnecting with another U-section, said carrier is divided into sections, each carrier section supporting one of said splicing modules supported in said U-section, whereby the configuration is formed by assembling a plurality of carrier sections by interconnecting the U-sections of the carrier sections.

13. A configuration as defined in claim 2, wherein each U-section is made of an elastic synthetic material.

14. A configuration as defined in claim 13, wherein each U-section has circular segment shaped recesses.

15. A configuration as defined in claim 2, wherein each U-section has circular segment shaped recesses.

16. A configuration as defined in claim 2, wherein each of said U-sections includes means for interconnecting with another U-section, said carrier is divided into sections, each carrier section supporting one of said splicing modules supported in said U-section, whereby the configuration is formed by assembling a plurality of carrier sections by interconnecting the U-sections of the carrier sections.

17. A configuration as defined in claim 2, wherein each splicing module further includes a spacer spacing it from adjacent modules.

18. A configuration as defined in claim 2, and further comprising a common fastening means for a plurality of the splicing modules.

19. A configuration as defined in claim 1, wherein each splicing module further includes a spacer spacing it from adjacent modules.

20. A configuration as defined in claim 1, and further comprising a common fastening means for a plurality of the splicing modules.

* * * * *